(12) United States Patent
Fusaro, Jr.

(10) Patent No.: US 6,265,689 B1
(45) Date of Patent: Jul. 24, 2001

(54) METHOD OF UNDERWATER CLADDING USING A POWDER-FAN PLASMA TORCH

(75) Inventor: Robert Anthony Fusaro, Jr., Cobleskill, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/557,392

(22) Filed: Apr. 24, 2000

(51) Int. Cl.[7] .................................................. B23K 10/00
(52) U.S. Cl. ................ 219/121.47; 219/121.45; 219/121.46; 219/76.16
(58) Field of Search ............... 219/121.47, 121.45, 219/121.46, 121.51, 76.15, 76.16, 73, 74, 72

(56) References Cited

U.S. PATENT DOCUMENTS

| | | |
|---|---|---|
| 3,707,615 | 12/1972 | Rotolico et al. . |
| 4,029,930 | 6/1977 | Sagara et al. . |
| 4,390,772 | 6/1983 | Hiratake . |
| 4,790,887 | 12/1988 | Niinivaara . |
| 5,043,548 | 8/1991 | Whitney et al. . |
| 5,393,949 | 2/1995 | Stricklen . |
| 5,690,844 | 11/1997 | White et al. . |
| 5,780,804 | 7/1998 | White et al. . |

*Primary Examiner*—Mark Paschall
(74) *Attorney, Agent, or Firm*—Noreen C. Johnson; Douglas E. Stoner

(57) ABSTRACT

A plasma arc torch includes a housing having a nozzle at one end with a central orifice. An electrode extends into the orifice for producing a plasma arc. A port is disposed in the nozzle adjacent the orifice for injecting powder into the arc. The port includes an outlet, an inlet, and a reniform manifold extending therebetween for laterally distributing the powder about the nozzle orifice. In this way, the powder may be carried to the torch underwater and is distributed circumferentially about the plasma arc while simultaneously diffusing its carrier gas.

3 Claims, 6 Drawing Sheets

METHOD OF UNDERWATER CLADDING USING A POWDER-FAN PLASMA TORCH

BACKGROUND OF THE INVENTION

The present invention relates generally to plasma arc welding, and, more specifically, to plasma arc welding or cladding underwater using a metal filler powder.

In one type of underwater welding, a filler metal in the form of a powder must be suitably delivered dry to a welding torch for welding or cladding, a metal workpiece underwater. In one welding technique being developed, an Underwater Plasma Transferred Arc (UPTA) is used for cladding certain components of a Boiling Water Reactor (BWR) for enhancing the strength thereof.

In plasma arc welding, an electrical arc is formed in the presence of an ionizing gas to form a hot plasma which is used to melt the surface of the workpiece and upon which a filler powder is clad. A typical plasma torch includes a center electrode in a housing defining a second electrode between which the arc is formed. The ionizing gas is channeled through the torch and out a central nozzle orifice surrounding the center electrode's tip for forming the plasma. In a plasma transferred arc torch, the workpiece itself defines the second electrode, or ground, instead of the torch housing, and the arc is formed between the electrode and the workpiece. In either embodiment, the plasma generates sufficient heat for locally melting the workpiece and filler powder for cladding the workpiece.

The cladding process may be effected underwater by temporarily excluding or removing water from the immediate vicinity of the plasma arc so that the powder may be melted atop the developed melt pool which is quench cooled as the torch is carried along a welding path.

The water is temporarily excluded from the vicinity of the plasma torch by introducing a pressurized shielding gas inside a surrounding skirt for displacing the water therefrom. The pressure of the shielding gas must be suitably higher than the hydrostatic pressure of the water at the particular depth for expelling the water from the skirt surrounding the torch nozzle. Correspondingly, the filler power is delivered to the torch using a suitable carrier gas which also must be at a suitably high pressure and flow rate for overcoming the hydrostatic pressure of the water at the specific depth.

In a typical plasma torch, a pair of diametrically opposite powder injection ports straddle the nozzle orifice from which the plasma arc is generated. The powder ports are simply tubular conduits extending through the nozzle and discharge radially outwardly of the nozzle orifice. As the depth underwater of the workpiece is increased, the hydrostatic pressure increases which in turn requires an increase in the pressure of the powder carrier gas which adversely affects the plasma and welding process as the powder is ejected. Testing has shown that high flow carrier gas causes the plasma arc to distort into two portions, which in turn results in formation of a double bead weld. This prevents the formation of a uniform weld or cladding layer and is therefore undesirable.

In U.S. Pat. No. 5,690,844, assigned to the present assignee, this problem has been addressed and significantly alleviated using a remote torch feed hopper in which the powder is delivered with a high flow and pressure carrier gas, with the gas being vented prior to final delivery of the powder to the nozzle. In this way, the powder may be carried to substantial depths underwater and vented to minimize adverse affect when injected into plasma arc.

The present invention relates to another solution to this problem which may be used instead of or with the solution disclosed in that patent.

SUMMARY OF THE INVENTION

A plasma arc torch includes a housing having a nozzle at one end with a central orifice. An electrode extends into the orifice for producing a plasma arc. A port is disposed in the nozzle adjacent the orifice for injecting powder into the arc. The port includes an outlet, an inlet, and a reniform manifold extending therebetween for laterally distributing the powder about the nozzle orifice. In this way, the powder may be carried to the torch underwater and is distributed circumferentially about the plasma arc while simultaneously diffusing its carrier gas.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENTS

Figure 1:
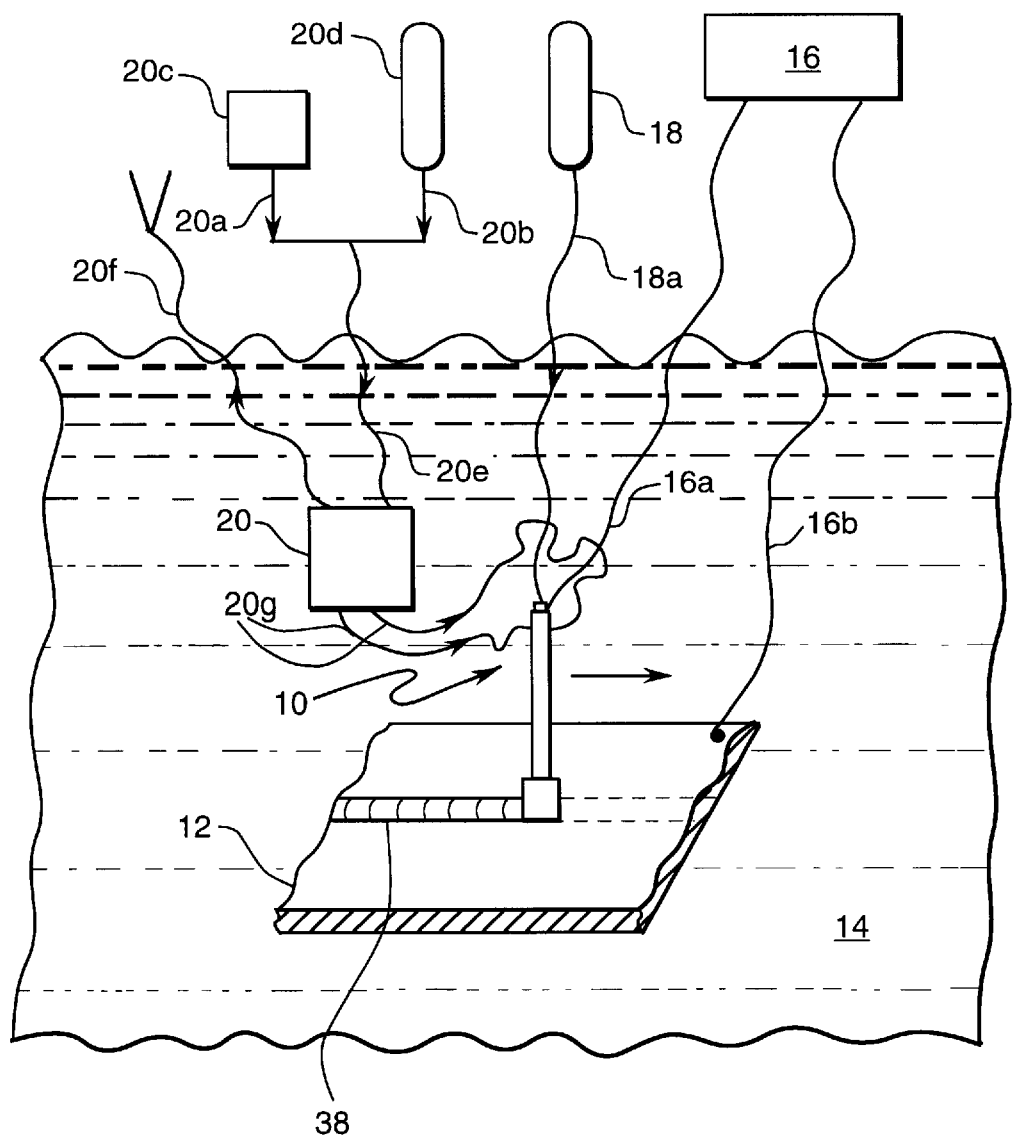
FIG. 1 is a schematic, elevational view of an underwater plasma transferred arc torch for welding or cladding a workpiece at depth underwater in accordance with an exemplary embodiment of the present invention.

Illustrated schematically in FIG. 1 is an Underwater Plasma Transferred Arc (UPTA) torch 10 in accordance with an exemplary embodiment of the present invention for welding a metallic workpiece 12 at a suitable depth under water 14. The workpiece 12 may be any of various internal components in a BWR nuclear reactor for which cladding thereof is desired, although the invention may be used for other applications as desired.

The plasma torch 10 is disposed in a system including a power supply 16 having one electrical lead 16a joined to the torch 10, and a second electrical lead 16b joined to the workpiece 12 for providing an electrical ground. A first gas supply 18 is joined in flow communication with the torch 10 using a flexible conduit for supplying an inert gas 18a, such as Argon, for use in developing the plasma and providing a suitable shielding gas therearound.

A remote torch feed hopper 20 may be disposed underwater adjacent to the torch 10 and receives metallic filler powder 20a and a carrier gas 20b therefor, such as Argon. A powder supply 20c and a carrier gas supply 20d are located above the water and are joined to the hopper 20 using a flexible conduit 20e. The carrier gas 20b is provided under high pressure and high flow rate for carrying the powder 20a to the hopper 20 at the desired depth underwater for overcoming the hydrostatic pressure thereof. Upon reaching the hopper, excess carrier gas is vented through a suitable vent 20f. A pair of feed conduits 20g join the hopper 20 to the torch 10 for delivering the powder 20a thereto using the residual carrier gas 20b therewith. The feed hopper 20 may take the form disclosed in the U.S. patent referenced above.

Figure 2:
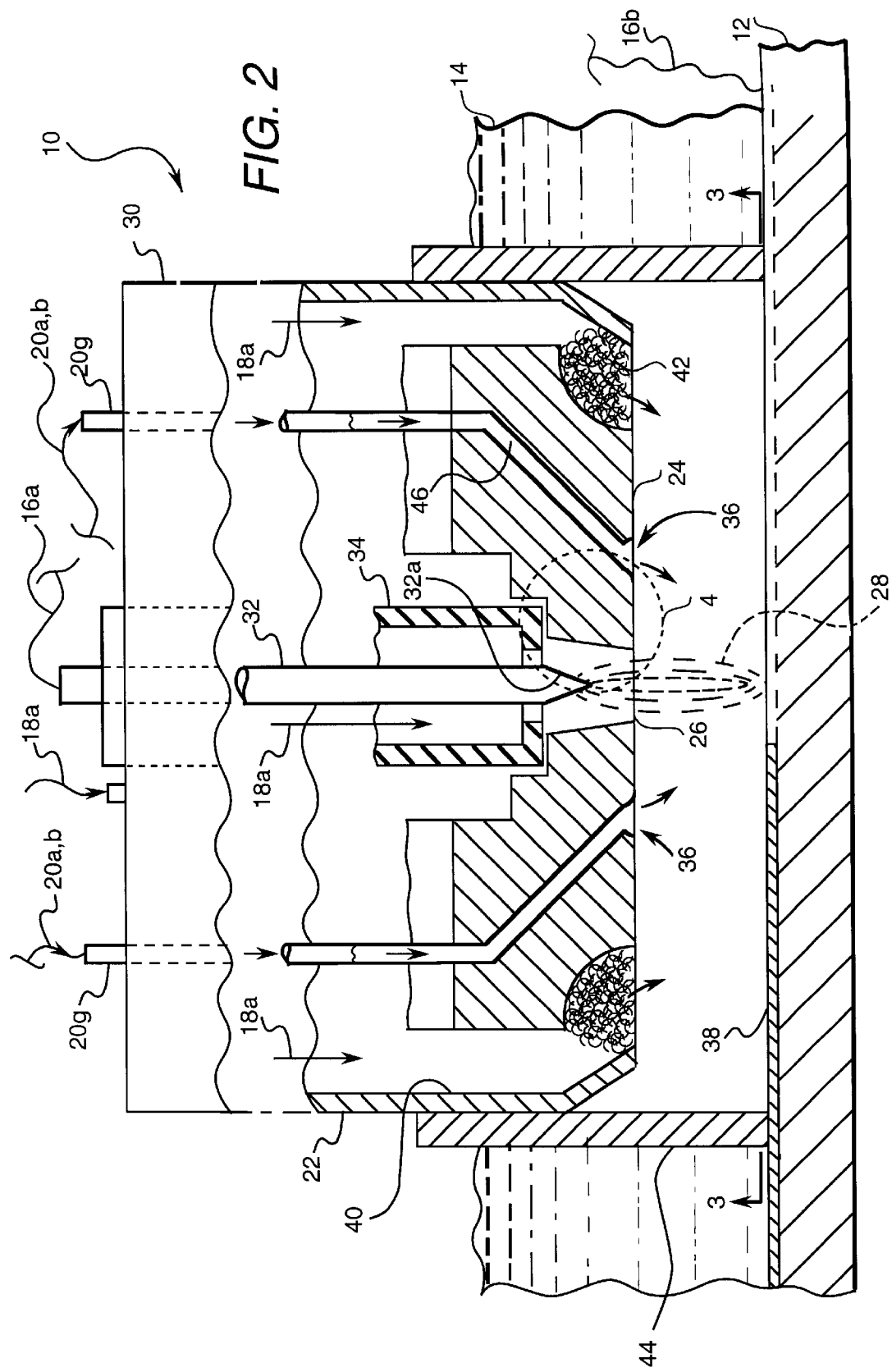
FIG. 2 is a partly sectional, elevational view of the plasma torch illustrated in FIG. 1 including a pair of powder injection ports in accordance with an exemplary embodiment of the present invention.

The torch 10 is illustrated in an exemplary embodiment in FIG. 2. The torch includes a tubular housing 22 which may take the form of conventional gas lens and is substantially closed. The housing 22 includes a nozzle 24 in the form of an end plate at the tip or bottom end thereof which includes a central orifice 26 from which a plasma arc or plume 28 is generated. The housing 22 also includes a cap 30 at its opposite, axially upper or top end suitably joined in flow communication with the hopper conduits 20g for receiving the powder 20a and carrier gas 20b from the hopper 20, and is also joined to the gas supply 18 for receiving the inert gas 18a therefrom.

A vertically elongate center electrode 32 extends axially through the housing 22, and has a lower tip 32a disposed in the nozzle orifice 26 for producing the plasma arc or plume 28. A tubular electrical insulator 34 surrounds the electrode 32 and electrically insulates it from the remainder of the metallic housing 22.

Figure 3:
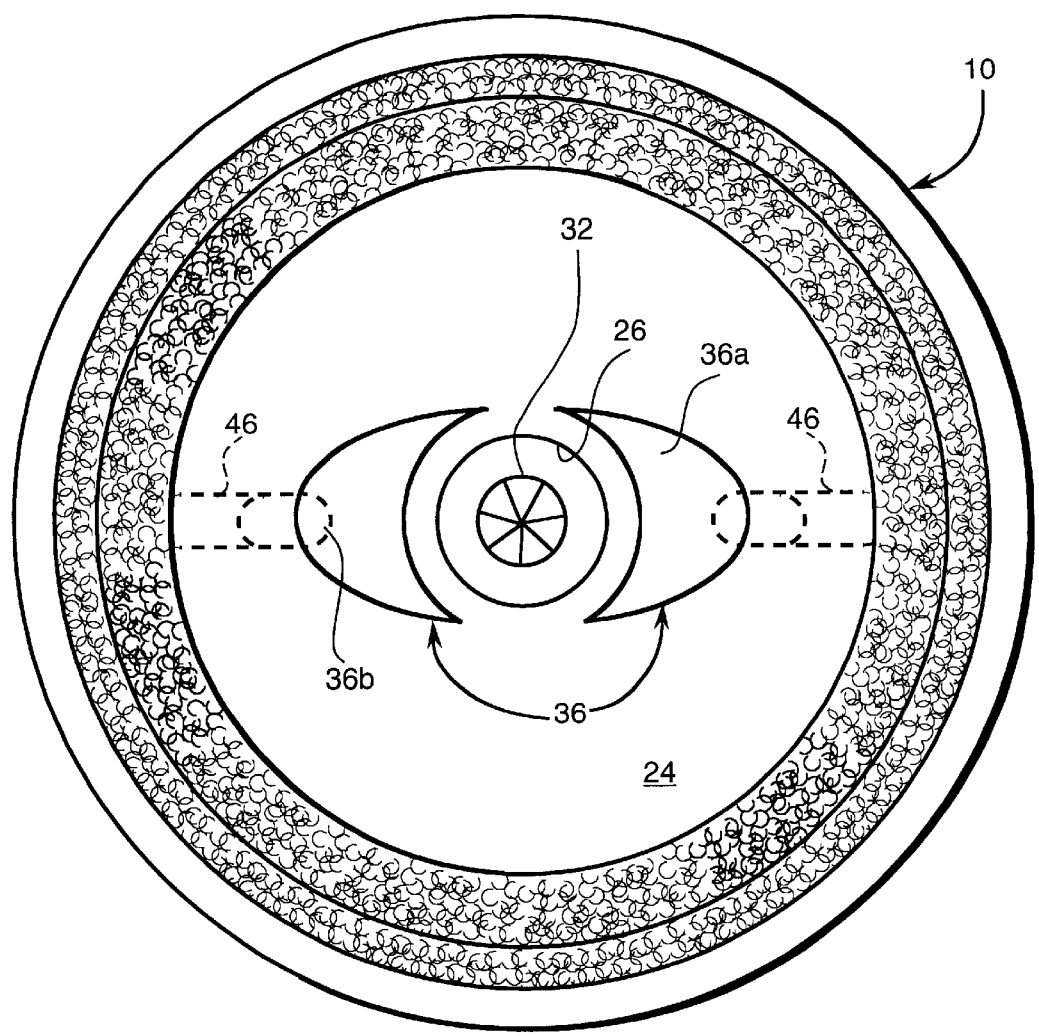
FIG. 3 is an upwardly facing end view of the plasma torch illustrated in FIG. 2 and taken generally along line 3—3.

In accordance with a preferred embodiment of the present invention, the torch 10 further includes a pair of powder ports 36 disposed in the nozzle 24 adjacent the orifice 26 for injecting the filler powder 20a into the plasma arc during operation. The powder ports 36 are preferably identical, and symmetrically disposed on opposite circumferential sides of the nozzle orifice 26 at 180 apart for simultaneously injecting the powder into the plasma arc. This is best illustrated in FIG. 3.

Figure 4:
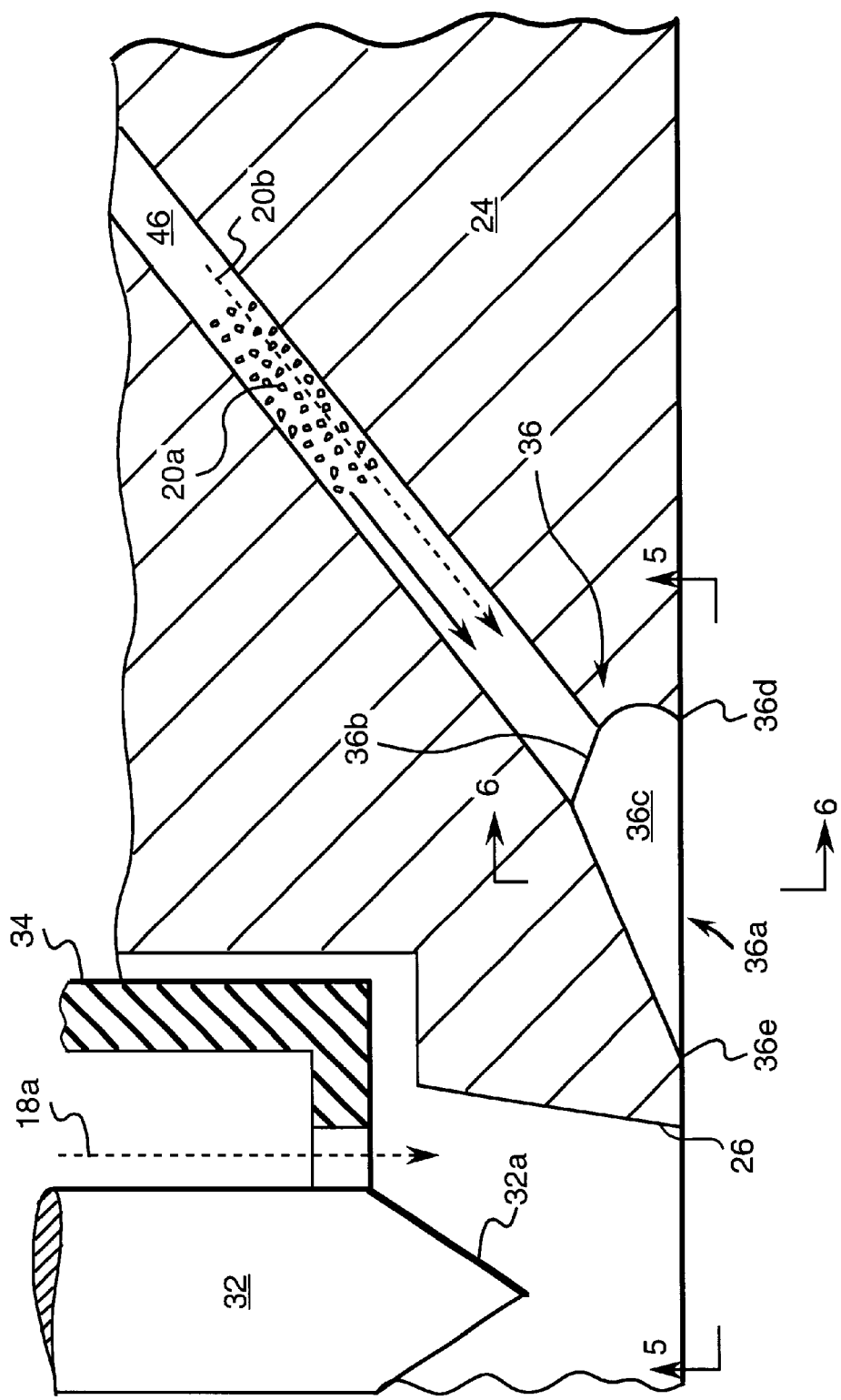
FIG. 4 is an enlarged, elevational sectional view through one of powder ports adjacent the nozzle orifice illustrated in FIG. 2 within the dashed circle labeled 4.

An exemplary one of the powder ports 36 is illustrated in more detail in elevational view in FIG. 4. Each port 36 includes an outlet 36a which is disposed coplanar with the bottom flat surface of the nozzle 24 in a common plane with the outlet of the nozzle orifice 26. An annular inlet 36b is spaced vertically above the outlet 36a and upwardly away from the nozzle bottom. A manifold 36c extends between the inlet 36b and the outlet 36a and is reniform or kidney-shaped for laterally or circumferentially distributing the powder 20a about the nozzle orifice 26 on diametrically opposite sides thereof.

The improved plasma torch 10 illustrated in FIG. 2 is effective for welding or cladding the workpiece 12 at substantial depth underwater up to about 25 meters, for example, without the injected powder and carrier gas distorting the plasma arc in order to form a uniform weld bead 38 as a torch 10 is traversed across the workpiece 12 underwater. The plasma arc 28 is generated by electrically ionizing the inert gas 18a, a portion of which is channeled downwardly through the hollow insulator 34 for discharge around the electrode tip 32a. The plasma arc 28 projects downwardly across a suitable standoff distance between the bottom of the nozzle 24 and the top of the workpiece 12.

Another portion of the inert gas 18a flows downwardly through the housing 12 in a perimeter shielding channel 40 which discharges the shielding gas through a porous metal wool 42 in the standoff volume below the nozzle 24. The metal wool 42 distributes the shielding gas around the circumference of the nozzle 24, and may be in the form of Tecknit commercially available from the Tecknit Company, Cranford, N.J.

A tubular exclusion fender or skirt 44 surrounds the nozzle 24 for containing the shielding gas in the standoff volume and displacing the water 14 therefrom. The shielding gas is provided under suitable pressure exceeding the hydrostatic pressure of the water to provide a temporary exclusion zone in which the plasma arc 28 is maintained and receives the injected powder for welding or cladding the workpiece 12.

The filler powder 20a is carried in the carrier gas 20b through the two powder ports 36 for injection atop the workpiece 12 for the cladding thereof. As indicated above, the ports 36 are reniform in contour for circumferentially or laterally distributing the powder about the plasma arc while simultaneously diffusing the carrier gas 20b to clad the workpiece 12 with a substantially undistorted, uniform weld bead 38.

As shown in FIG. 3, the two diametrically opposite powder ports 36 are effective for circumferentially distributing the powder 20b around the plasma arc in a corresponding plurality of reniform segments. In this way, the ports disperse the powder in a horizontal or fan spray around the circumference of the nozzle orifice 26 for uniformly engaging the plasma arc. The powder is confined in the powder ports due to the preferred contour thereof to circumferentially spread the powder therein and diffuse the carrier gas prior to distribution around the plasma arc. By diffusing the carrier gas in the ports 36, its velocity is reduced as the powder is uniformly dispersed around the plasma arc.

As illustrated in FIGS. 3 and 4, the port outlet 36a is disposed at least in part radially between the nozzle orifice 26 and the port inlet 36b for discharging the powder 20a radially inwardly toward the plasma arc.

The nozzle 24 further includes an inclined tubular inlet channel 46 for each of the powder ports 36 which extends upstream from the respective inlets 36b thereof. Each inlet channel 46 is preferably straight and extends radially outwardly from the nozzle orifice 26 and is inclined vertically upwardly for directing the powder radially inwardly and downwardly toward the nozzle orifice 26 to engage the plasma arc in the standoff region below the nozzle 24. As shown in FIG. 3, the two inlet channels 46 are aligned with each other along a common diameter of the nozzle 24 and are 180 apart in the preferred embodiment. In alternate embodiments, the inlet channels 46 may be otherwise located and skewed for distributing the powder.

Figure 5:
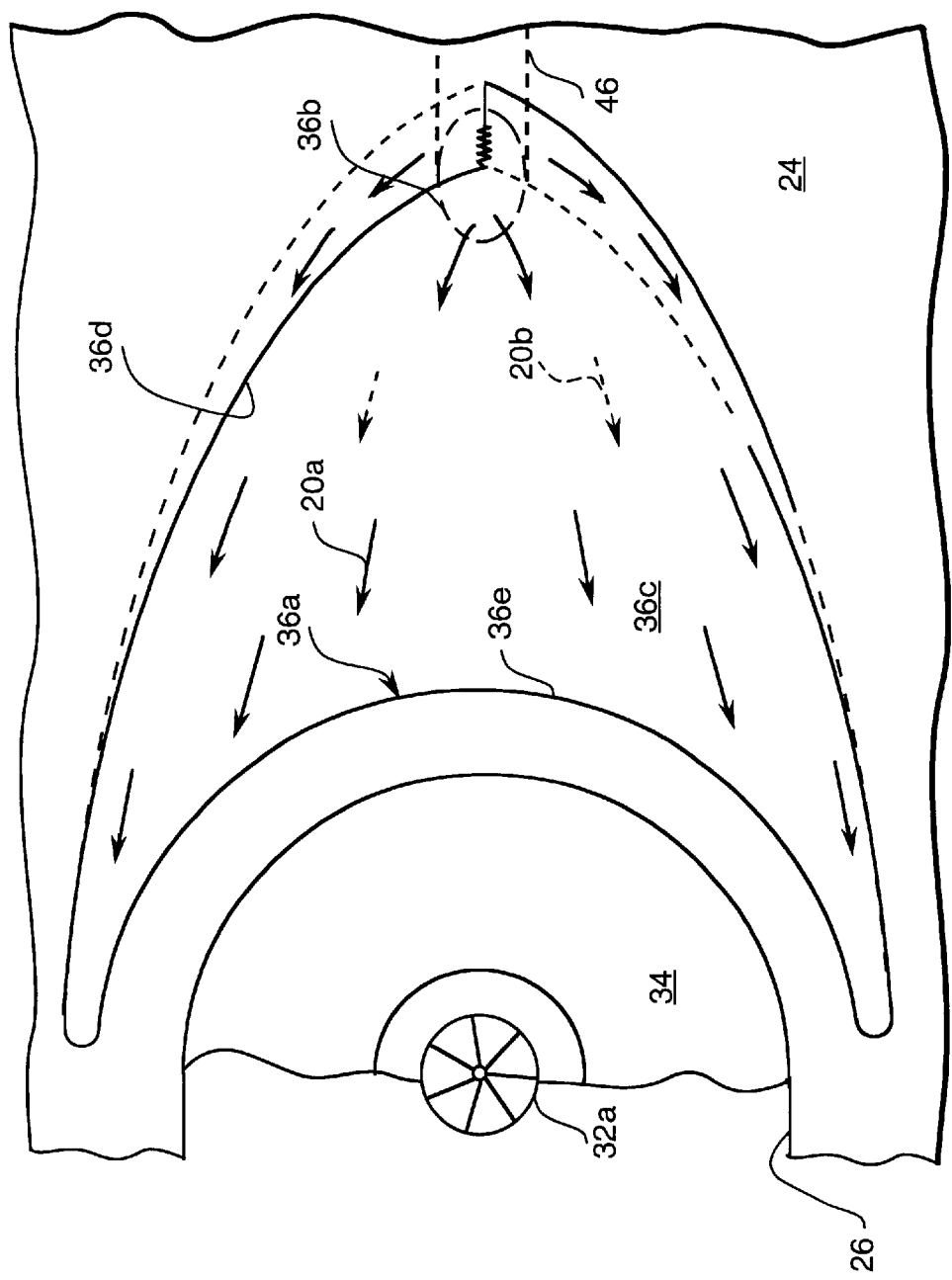
FIG. 5 is an end view of the powder injection port illustrated in FIG. 4 and taken generally along line 5—5.

The inlet channel 46 illustrated in FIG. 4 is preferably tubular or circular and may be cast or drilled in the nozzle 24, with the port inlet 36b being annular or elliptical where it joins the manifold 36c. As shown in FIG. 5, the port outlet 36a is reniform in its horizontal section where it emerges from the bottom of the nozzle 24. And, the port manifold 36c diverges in flow area between the inlet 36b and the outlet 36a to laterally distribute the powder 20a and disperse the carrier gas 20b.

In order to prevent the powder 20a from being concentrated as it is ejected from the inlet channel 46, the port 36a and manifold 36c are contoured in accordance with the present invention to initially confine the powder in a circumferentially spreading fan pattern prior to its distribution around the nozzle orifice 36. As shown in FIG. 5, the port outlet 36a is defined by a laterally concave upstream first edge 36d disposed adjacent to the port inlet 36b, and a laterally concave downstream second edge 36e spaced radially therefrom in most part, and disposed adjacent the nozzle orifice 26. The outlet first and second edges 36d,e are preferably laterally symmetrical about a radial axis extending from the center of the electrode tip 32a and have center apexes therealong. The port inlet 36b is preferably centered about the outlet first edge 36d.

The outlet first and second edges 36d,e intersect each other at opposite lateral ends which wrap around a major portion of the opposite halves of the nozzle orifice 26. In this way, each port outlet 36a is kidney-shaped in the horizontal plane and decreases in radial length from its center to its laterally opposite end or wings.

Figure 6:
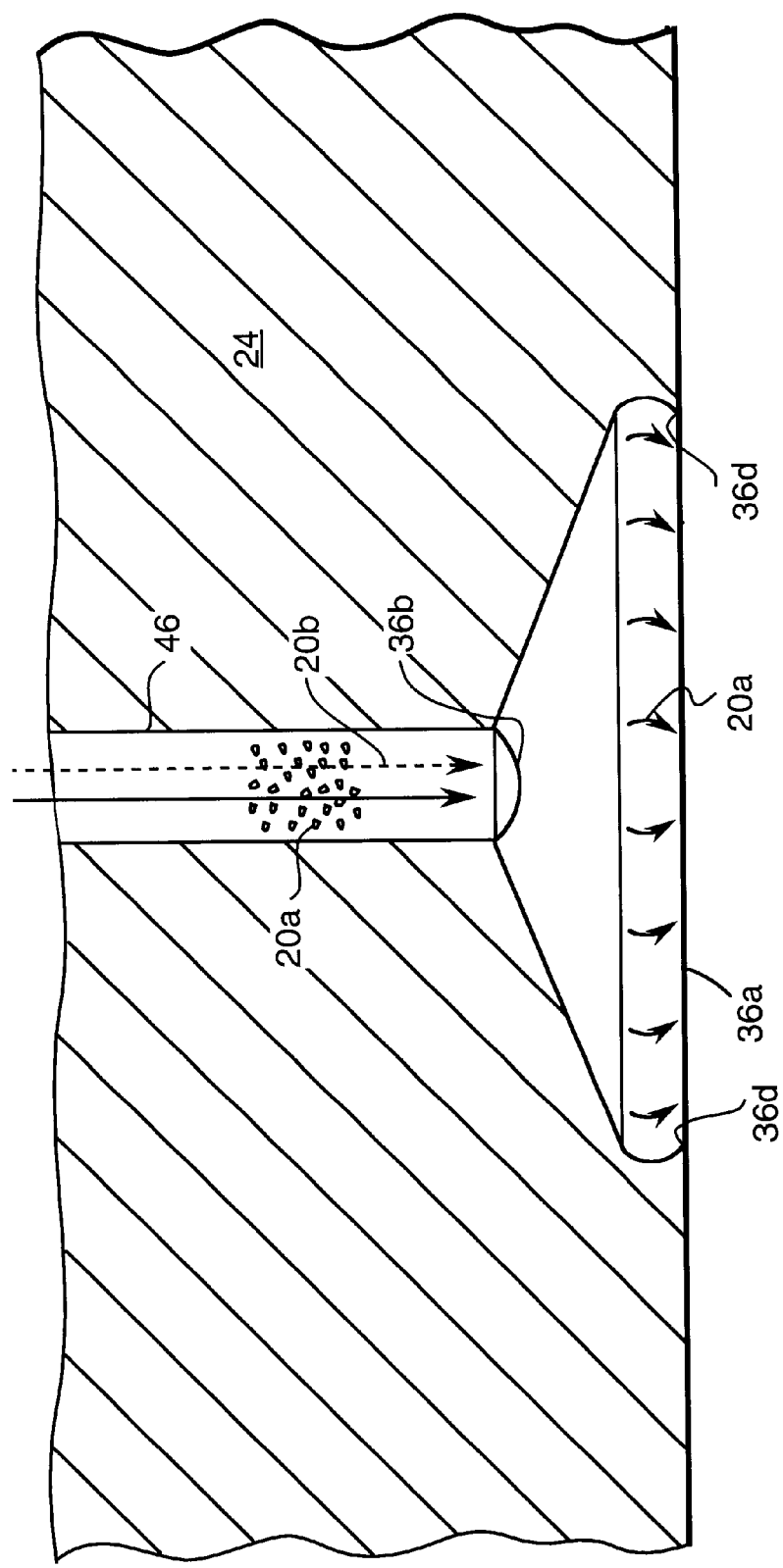
FIG. 6 is a transverse elevational sectional view through the powder port illustrated in FIG. 4 and taken generally along line 6—6.

As shown in FIG. 5, the port manifold 36c is similarly concave laterally or circumferentially to generally match the reniform profile of the port outlet 36a. However, and is best seen in FIGS. 4 and 6, the port manifold 36c is also concave vertically or along the longitudinal axis of the port, at least along the outlet first edge 36d. The port manifold 36c therefore defines an acute lip along the outlet first edge 36d which hides from below the nozzle 24 upstream portion or back wall of the manifold 36c. This lip helps trap and circumferentially distribute the powder 20a as it is discharged with the carrier gas 20b into the manifold 36 from the port inlet 36b.

As shown in FIGS. 4 and 5, the manifold 36c joins the outlet second edge 36e at an obtuse angle in a smooth transition therewith. In this way, some of the powder is initially confined in the manifold by the lip along the outlet upstream first edge 36d and is distributed circumferentially along the wings of the manifold. The powder is discharged from the port outlet 36a in a fan pattern to circumferentially surround a corresponding arcuate portion of the nozzle orifice 26 to engage to the plasma arc therein.

As shown in FIGS. 3 and 5, the second edges 36e of the two ports 36 circumferentially surround the nozzle orifice 26 in most part to uniformly distribute the powder therearound. The circumferential extent of the downstream edges 36e for each of the ports 36 is slightly less than 180 since the powder ejected therealong has inertia to carry it in meeting the powder from the diametrically opposite port 36. The nozzle orifice 26 is therefore effectively surrounded by the injected powder which circumferentially confines the plasma arc maintaining undistorted symmetrical form during operation resulting in the formation of a uniform weld bead.

Although two symmetrical powder ports 36 are illustrated in the preferred embodiment, additional ports may be used but increase the complexity of the plumbing required therefor. However, two symmetrically disposed powder ports 36 as substantially illustrated have been built and tested to confirm satisfactory operation in the generation of a uniform weld bead underwater without plasma arc distortion, or split or double humped weld beads previously experienced without the invention.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A method of cladding a workpiece underwater comprising;

forming a plasma arc underwater atop said workpiece;

delivering a powder in a carrier gas to said workpiece; and using a reniform manifold for circumferentially distributing said powder about said plasma arc while simultaneously diffusing said carrier gas to clad said workpiece.

2. A method of cladding a workpiece underwater comprising:

forming a plasma arc underwater atop said workpiece;

delivering a powder in a carrier gas to said workpiece;

and circumferentially distributing said powder about said plasma arc in a plurality of reniform segments while simultaneously diffusing said carrier gas to clad said workpiece.

3. A method according to claim 2 wherein said powder is confined to circumferentially spread prior to distribution around said plasma arc.

* * * * *